(12) United States Patent
Chun

(10) Patent No.: US 10,140,223 B2
(45) Date of Patent: Nov. 27, 2018

(54) SYSTEM AND METHOD FOR ODD MODULUS MEMORY CHANNEL INTERLEAVING

(71) Applicant: QUALCOMM INCORPORATED, San Diego, CA (US)

(72) Inventor: Dexter Tamio Chun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 220 days.

(21) Appl. No.: 15/193,423

(22) Filed: Jun. 27, 2016

(65) Prior Publication Data

US 2017/0371812 A1    Dec. 28, 2017

(51) Int. Cl.
| | | |
|---|---|---|
| G06F 12/06 | (2006.01) | |
| H03M 13/27 | (2006.01) | |
| G06F 13/16 | (2006.01) | |
| G06F 3/06 | (2006.01) | |
| G06F 13/40 | (2006.01) | |

(52) U.S. Cl.
CPC ........ *G06F 13/1678* (2013.01); *G06F 3/0613* (2013.01); *G06F 3/0659* (2013.01); *G06F 3/0673* (2013.01); *G06F 12/0607* (2013.01); *G06F 13/4068* (2013.01); *G06F 2213/0038* (2013.01)

(58) Field of Classification Search
None
See application file for complete search history.

(56) References Cited

U.S. PATENT DOCUMENTS

| 5,430,764 A | * | 7/1995 | Chren, Jr. ............. G06F 1/0328 331/187 |
| 6,807,603 B2 | * | 10/2004 | Gupta ................. G06F 12/0607 711/157 |
| 7,873,800 B2 | * | 1/2011 | Berkeman ........... H03M 13/271 711/157 |
| 9,110,795 B2 | | 8/2015 | Stewart et al. |
| 9,141,541 B2 | | 9/2015 | Kalyanasundharam et al. |

(Continued)

OTHER PUBLICATIONS

International Search Report and Written Opinion—PCT/US2017/034587—ISA/EPO—dated Aug. 21, 2017.

*Primary Examiner* — Hyun Nam
(74) *Attorney, Agent, or Firm* — Smith Tempel Blaha LLC/Qualcomm

(57) ABSTRACT

A system for providing odd modulus memory channel interleaving may include a dynamic random access memory (DRAM) system and a system on chip (SoC). The SoC comprises a first memory controller, a second memory controller, and a symmetric memory channel interleaver. The first memory controller is electrically coupled to a first DRAM module via a first memory bus. The second memory controller is electrically coupled to a second DRAM module and a third DRAM module via a second memory bus. The symmetric memory channel interleaver is configured to uniformly distribute DRAM traffic to the first memory controller and the second memory controller. The first memory controller provides a first interleaved channel to the first DRAM module via the first memory bus. The second memory controller provides a second interleaved channel to the second DRAM module via upper address bits on the second memory bus.

30 Claims, 6 Drawing Sheets

(56) References Cited

U.S. PATENT DOCUMENTS

| | | |
|---|---|---|
| 9,268,691 B2 | 2/2016 | Sharma et al. |
| 2007/0022261 A1* | 1/2007 | Young .................. G06F 13/1647 |
| | | 711/157 |
| 2010/0332775 A1 | 12/2010 | Kapil et al. |
| 2011/0320698 A1 | 12/2011 | Wang et al. |
| 2015/0046732 A1 | 2/2015 | Chun et al. |
| 2015/0095595 A1 | 4/2015 | Wang et al. |
| 2015/0100746 A1 | 4/2015 | Rychlik et al. |

\* cited by examiner

SYSTEM AND METHOD FOR ODD MODULUS MEMORY CHANNEL INTERLEAVING

DESCRIPTION OF THE RELATED ART

Many computing devices, including portable computing devices such as mobile phones, include a system on chip ("SoC"). SoCs are demanding increasing power performance and capacity from memory devices, such as, double data rate (DDR) memory devices. These demands lead to both faster clock speeds and wide busses, which are then typically partitioned into multiple, narrower memory channels in order to remain efficient. Multiple memory channels may be address-interleaved together to uniformly distribute the memory traffic across memory devices and optimize performance. Memory data is uniformly distributed by assigning addresses to alternating memory channels. This technique is commonly referred to as symmetric channel interleaving.

Channel interleaving is an effective and simple way to combine the bandwidth of multiple memory channels in order to provide a higher total bandwidth while keeping individual channel widths of a manageable size. Interleaving between two channels is relatively simple and widely-used because it requires only a single bit of the memory address to interleave or "ping-pong" between the two channels. Interleaving between higher powers of two (e.g., four, eight, etc.) is also relatively straightforward because these implementations only require an additional bit of the memory address for every doubling of the number of memory channels.

While interleaving an odd number of memory channels (i.e., odd-way or odd-modulus interleaving) is possible, it is typically avoided due to the added cost and complexity. Odd-way interleaving is significantly more complex because a larger portion of the memory address bits are required to implement the interleave process. Having to check a larger number of memory address bits results in several problems. The complexity of the digital logic is increased. The maximum speed of the interleaver may also be reduced because the address-checking is performed in real-time. In this manner, existing memory interleaving implementations involve design trade-offs between die area, memory bandwidth requirements, and interleave complexity. For example, four memory channels provide an increased level of total bandwidth than two memory channels, but at the cost of increased SoC die area. While three memory channels may provide an intermediate level of total bandwidth at a marginal increase in SoC die, three-way interleaving involves added complexity. Because the addresses for each channel are separated by a factor of three multiplied by the block size (e.g., 1024 bytes), all address bits above bit "10" must be used to determine which of the three memory channels is being selected.

Accordingly, there is a need for improved systems and methods for providing odd-modulus interleaving that enables low system cost without undue complexity.

SUMMARY OF THE DISCLOSURE

Systems and methods are disclosed for odd modulus memory channel interleaving. An embodiment of system for providing odd modulus memory channel interleaving comprises a dynamic random access memory (DRAM) system and a system on chip (SoC). The SoC comprises a first memory controller, a second memory controller, and a symmetric memory channel interleaver. The first memory controller is electrically coupled to a first DRAM module via a first memory bus. The second memory controller is electrically coupled to a second DRAM module and a third DRAM module via a second memory bus. The symmetric memory channel interleaver is configured to uniformly distribute DRAM traffic to the first memory controller and the second memory controller. The first memory controller provides a first interleaved channel to the first DRAM module via the first memory bus. The second memory controller provides a second interleaved channel to the second DRAM module via upper address bits on the second memory bus and a third interleaved channel to the third DRAM module via lower address bits on the second memory bus.

Another embodiment is a method for providing odd modulus memory channel interleaving. In an embodiment, a memory address space for a dynamic random access memory (DRAM) system is partitioned into a plurality of blocks. The blocks are uniformly assigned to a first interleave channel and a second interleave channel. A first DRAM bus for the first interleave channel and a second DRAM bus for the second interleave channel are asymmetrically configured to provide an odd-way interleave via the first and second interleave channels.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
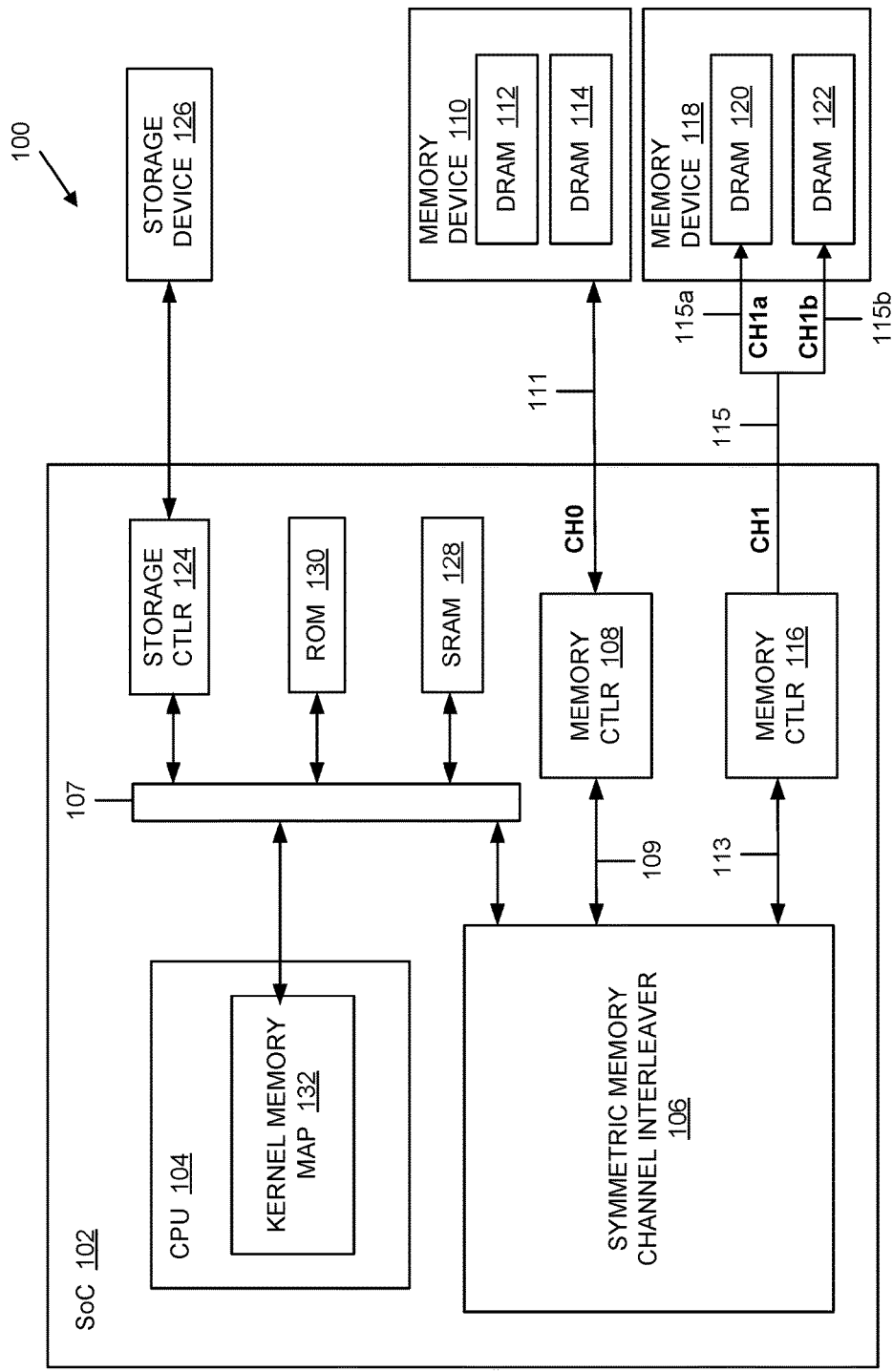
FIG. 1 is a block diagram of an embodiment of a system for providing three-way memory channel interleaving.

FIG. 1 illustrates an embodiment of a system 100 for providing odd-modulus memory channel interleaving. The system 100 may be implemented in any computing device, including a personal computer, a workstation, a server, or a portable computing device (PCD), such as a cellular telephone, a portable digital assistant (PDA), a portable game console, a palmtop computer, a tablet computer, or a wearable device or any type of portable battery-powered computing device.

As illustrated in the embodiment of FIG. 1, the system 100 comprises a system on chip (SoC) 102 comprising various on-chip components and various external components connected to the SoC 102. The SoC 102 comprises one or more processing units, a symmetric (i.e., even-way) memory channel interleaver 106, a storage controller 124, and on-board memory (e.g., a static random access memory (SRAM) 128, read only memory (ROM) 130, etc.) interconnected by SoC bus 107. The storage controller 124 is electrically connected to and communicates with an external storage device 126. As known in the art, the symmetric memory channel interleaver 106 receives read/write memory requests associated with the CPU 104 (or other memory clients) and distributes the memory data between two or more memory controllers, which are connected to respective external memory devices via a dedicated memory channel.

In the exemplary embodiment of FIG. 1, the system 100 implements three-way memory channel interleaving. It should be appreciated, however, that the methods and techniques described herein may be readily extended to any odd number of memory channels (e.g., 5-way, 7-way, 9-way, etc.). As described below in more detail, the system 100 provides three-way memory channel interleaving via a symmetric two-way channel interleaver and a specially configured memory address map. The system 100 comprises two memory devices 110 and 118 with respective memory controllers 108 and 116. The memory device 110 is connected to the memory controller 108 via a memory bus 111 for providing a first memory channel (CH0). The memory device 118 is connected to the memory controller 116 via a memory bus 115 for providing a second memory channel (CH1). The memory controllers 108 and 116 are connected to the symmetric memory channel interleaver 106 via a bus 109 and a bus 113, respectively.

It should be appreciated that any number of memory devices, memory controllers, and memory channels may be used in the system 100 with any desirable types, sizes, and configurations of memory (e.g., double data rate (DDR) memory). In the embodiment of FIG. 1, the memory device 110 supported via channel CH0 comprises two dynamic random access memory (DRAM) modules: a DRAM 112 and a DRAM 114. The memory device 118 supported via channel CH1 also comprises two DRAM modules: a DRAM 120 and a DRAM 122. The DRAM device can be of any type, for example DDR3, DDR4, LPDDR3, LPDDR4, SDRAM, GDDR4, GDDR5, HBM, WideIO2, etc.

Figure 4:
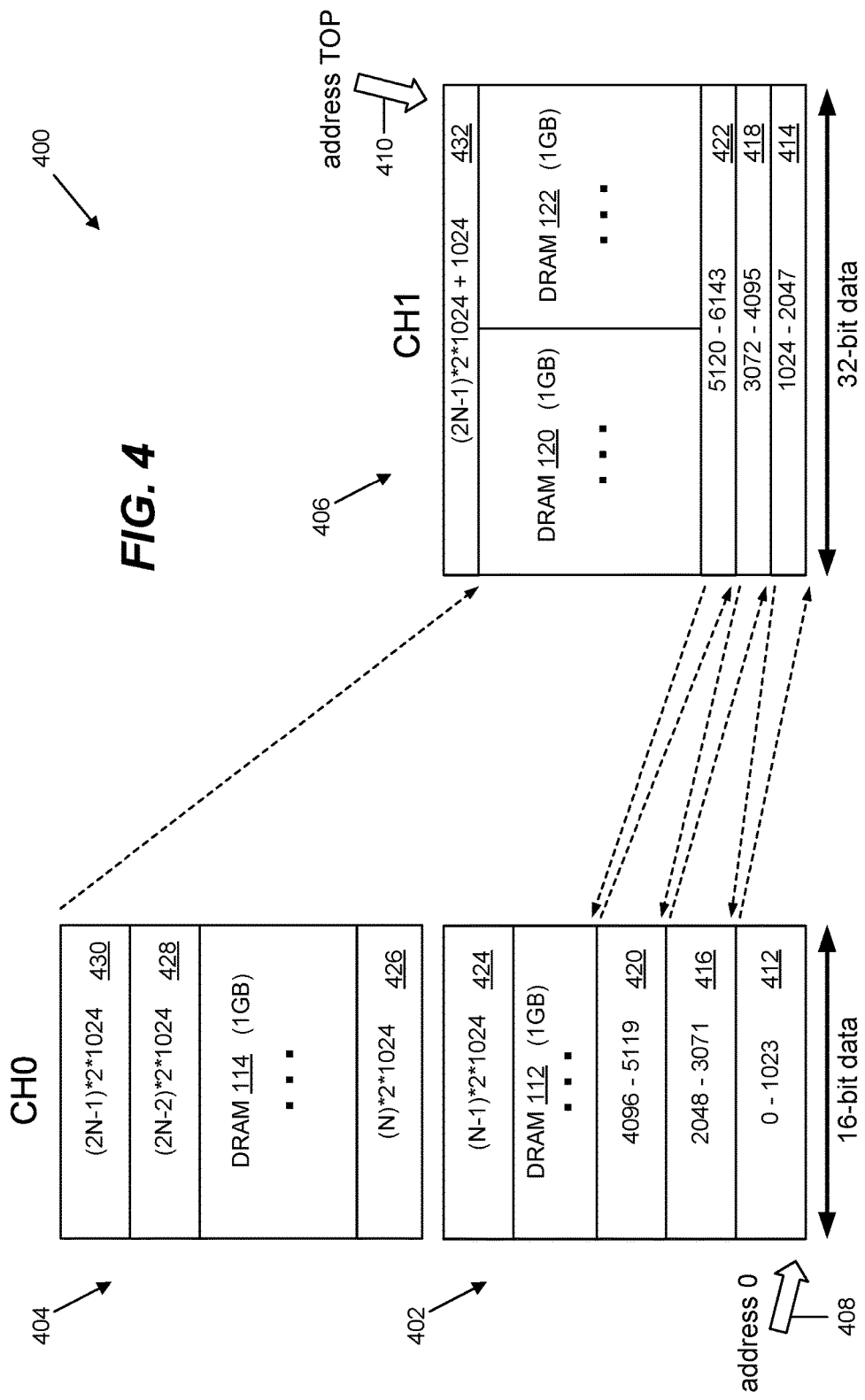
FIG. 4 is data/flow diagram illustrating the structure and operation of an exemplary memory address map implemented in the system of FIG. 1.

In the exemplary embodiment of FIG. 1, the system 100 implements three-way interleaving via the symmetric two-way channel interleaver 106 and a specially configured memory address map (e.g., memory address map 400 in FIG. 4). It should be appreciated that the symmetric two-way channel interleaver 106 may operate using a symmetrical power-of-two interleaving technique in a conventional manner, which only involves a minimum number of memory address bits to uniformly distribute DRAM traffic between memory controllers 108 and 116 via bus 109 and bus 113, respectively. The specially-configured memory address map 400 used by the symmetric two-way channel interleaver 106 enables the two memory controllers 108 and 116 to physically interleave across three DRAM modules using the two memory channels CH0 and CH1. In this regard, the DRAM modules and the physical memory controllers 108 and 116 are implemented asymmetrically such that the total bandwidth and capacity yield the benefits of odd-modulus memory channel interleaving.

As illustrated in FIG. 1, the system 100 may physically interleave three DRAM channels via the two memory channels CH0 and CH1 on bus 111 and bus 115, respectively. The first DRAM channel is physically implemented via memory channel CH0 on bus 111. The second and third DRAM channels are physically implemented via memory channel CH1 on bus 115. For example, in an embodiment, the SoC bus 107 may comprise a 128-bit data bus. The two buses 109 and 113 may comprise separate 64-bit data buses. To implement the odd-way interleave, memory bus 111 (CH0) may comprise a 16-bit DRAM bus and memory bus 115 may comprise a 32-bit DRAM bus. In this manner, the width of the CH0 bus 111 is half of the width of the CH1 bus 115. The first DRAM channel (which is used to access either DRAM module 112 or 114 at a time) may be provided by all 16 bits of memory bus 111. The second DRAM channel (which is used to access DRAM module 120) may be provided via the upper 16 bits of memory bus 115 (represented by reference numeral 115a). The third DRAM channel (which is used to access DRAM module 122) may be provided via the lower 16 bits of memory bus 115 (represented by reference numeral 115*b*). As will be described in FIG. 2, DRAM modules 120 and 122 may be operated concurrently, while DRAM modules 112 or 114 may not be operated concurrently. This means that DRAM modules 120 and 122 share the same memory controller channel and rank, and are therefore selected and activated simultaneously when a data packet is sent to that channel. On the other hand, DRAM modules 112 and 114 may only share the same memory controller channel, but are on different address ranks, and are therefore selected and activated only when the data packet is for their respected address rank.

To further illustrate the three-way interleaving method implemented in the system 100, the specially-configured memory address map used by the symmetric memory channel interleaver 106 will be further described. FIG. 4 illustrates one embodiment of a memory address map 400. It should be appreciated that the memory address map 400 may be configured, controlled, and managed via a high-level operating system (HLOS) executing on CPU 104.

FIG. 4 illustrates an exemplary memory address map 400 used by the symmetric memory channel interleaver 106 to implement the three-way interleaving described above. The memory address map 400 will be described to illustrate the general operation, architecture, and functionality of the system 100. The memory address map 400 represents the entire addressable space of the memory system illustrated in FIG. 1, which comprises DRAM modules 112 and 114 (accessed via memory channel CH0 on bus 111) and DRAM modules 120 and 122 (accessed via memory channel CH1 on bus 115).

Memory address map 400 defines an interleaved address space comprising memory partitions 402, 404, and 406. Each memory partition comprises a separate allocated memory address space with a corresponding address range. Memory partition 402 corresponds to DRAM module 112, which occupies address rank 0. Memory partition 404 corresponds to DRAM module 114, which occupies address rank 1. Memory partitions 402 and 404 combine to form the memory address space associated with memory channel CH0 for implementing the first DRAM channel. Note that on CH0, DRAM module 112 and DRAM module 114 may not be active at the same time. Memory partition 406 forms the memory address space associated with memory channel CH1 for implementing the second and third DRAM channels. Note that on CH1, DRAM module 120 and DRAM module 122 may always be active together.

Arrow 408 represents the lowest address (address 0) and belongs to the lowest 1024 byte block (block 412) and is within DRAM module 112. The next 1024 byte block in the interleaved address space may be assigned to the lowest 1024 byte block (block 414) with a starting address of 1024 and an ending address of 2047, and is within DRAM modules 120 and 122. The interleaved address space defines a pattern of alternating addresses that may be "striped" or interleaved across memory channels CH0 and CH1. The dashed arrows between channels CH0 and CH1 illustrate how memory accesses to ascending addresses would "ping-pong" between the memory channels. As further illustrated in FIG. 4, the succession of next addresses after block 414 follows blocks 416, 418, 420, and 422. In an embodiment, all blocks in both CH0 and CH1 may be 1024 bytes in size. The upper address of DRAM module 112 is represented at block 424. A lower address of DRAM module 114 is represented by block 424. A lower address of DRAM module 114 is represented at block 426. The last two addresses of DRAM module 114 are represented by block s 428 and 430. Arrow 410 represents a last address (address TOP) in the interleaved address space, which may be assigned to the highest address that will be located in the highest 1024 byte block (block 432) associated with DRAM modules 120 and 122.

As further illustrated in FIG. 4, the block sizes of the physical memory addresses may comprise a fixed size (e.g., 1024 bytes). In this example, each of DRAM modules 112, 114, 120, and 122 have a size of 1 GB, resulting in memory channels CH0 and CH1 each having a 2 GB density. Because the width of the CH0 bus 111 (i.e., 16 memory address bits) is half of the width of the CH1 bus 115 (i.e., 32 memory address bits), the memory bandwidth of CH0 is half that of CH1, which yields a total memory bandwidth of three times the CH0 memory bandwidth.

Figure 2:
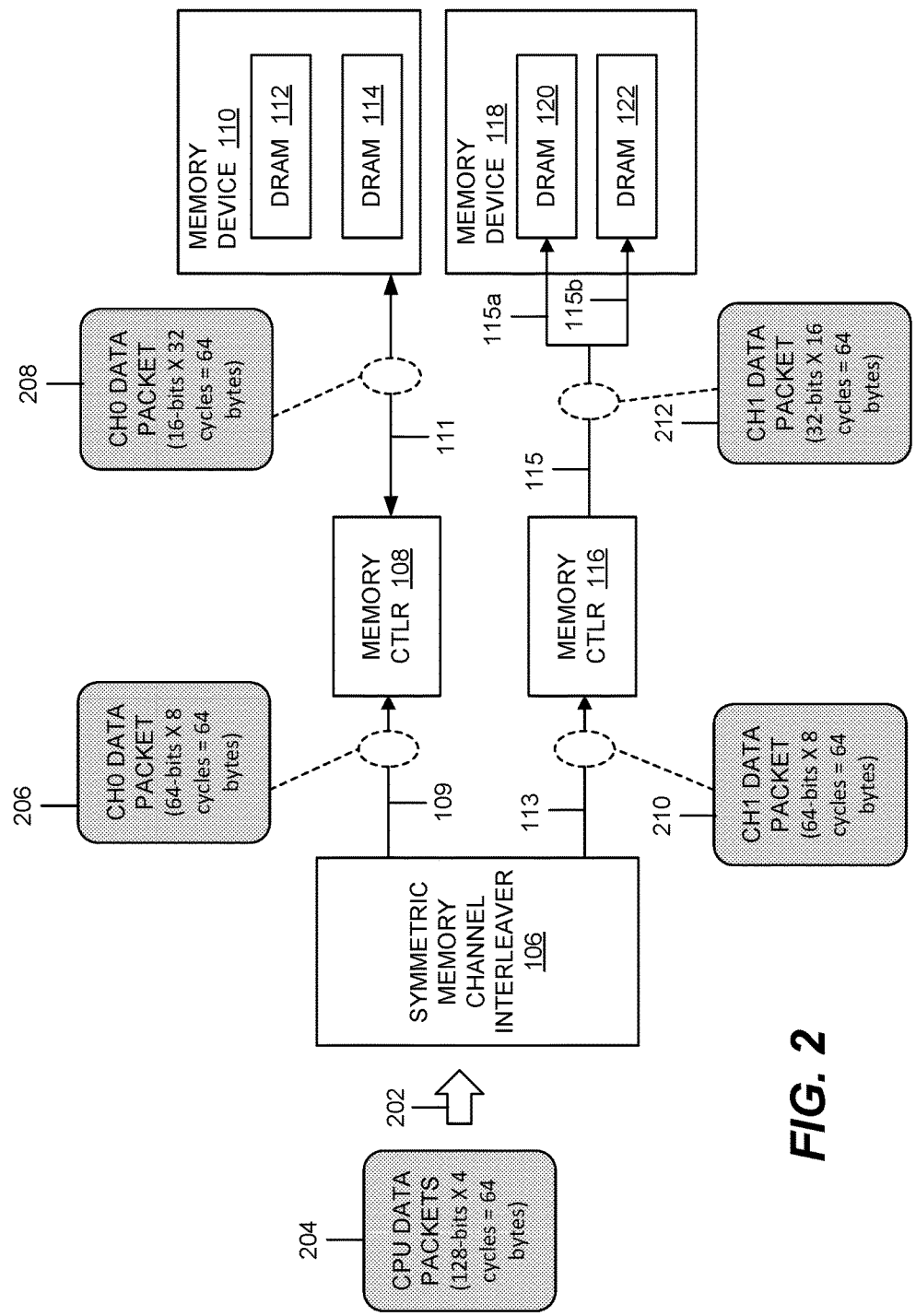
FIG. 2 is a combined block/flow diagram illustrating the operation of the two-way symmetric memory channel interleaver in the system of FIG. 1.

FIG. 2 illustrates an exemplary operation of the symmetric memory channel interleaver 106 in the system 100 of FIG. 1. In operation, symmetric memory channel interleaver 106 receives data packets 204 (arrow 202) from CPU 104. In an exemplary embodiment, each data packet may comprise 64 bytes of data (128-bits×4 clock cycles). The symmetric memory channel interleaver 106 implements 2-way interleaving in accordance with the memory address map 400 to uniformly distribute data packets 204 to the memory controllers 108 and 116. A CH0 data packet 206 distributed to the memory controller 108, via 64-bit bus 109, comprises 64 bytes (64-bits×8 cycles). The memory controller 108 provides a CH0 data packet 208 to either DRAM module 112 or 114 via the 16-bit CH0 bus 111. Only one of DRAM module 112 or 114 may be active at any given time. The CH0 data packet 208 comprises 64 bytes of data (16-bits×32 cycles). A CH1 data packet 210 is distributed to the memory controller 116, via 64-bit bus 113, comprises 64 bytes of data (64-bits×8 cycles). The memory controller 116 provides a CH1 data packet 212 to DRAM module 120 and 122 concurrently via the 32-bit CH1 bus 115. The CH1 data packet 212 comprises 64 bytes of data (32-bits×16 cycles).

It should be appreciated that the number of cycles refers to the number of times that the width of the data bus must be toggled to transfer a complete packet. Each cycle may be associated with a rising edge (single data rate), falling edge (single data rate), or rising and falling edge (double data rate), or multi-phase (quad data rate or more). Also, the bus clock frequency (which establishes the rate) at different locations may be the same or different. For example, in FIG. 2, the frequency of operation for the 64-bit buses 109 and 113 may be lower than the frequency of operation for the CH0 111 and CH1 115 buses. For example, as the internal SoC data path used becomes wider, the frequency used may be decreased. In this example, the frequency for both CH0 111 and CH1 115 buses are matched and equal to the frequency of operation that matched DRAM modules 112, 114, 120, and 122 are capable of supporting. In the case where the DRAM modules are not matched and support different frequencies (e.g., when a user installs DRAM modules of different speed grades), the frequency for both CH0 111 and CH1 115 buses may be both set to the frequency supported by the DRAM module(s) with the lower operational frequency.

Figure 3:
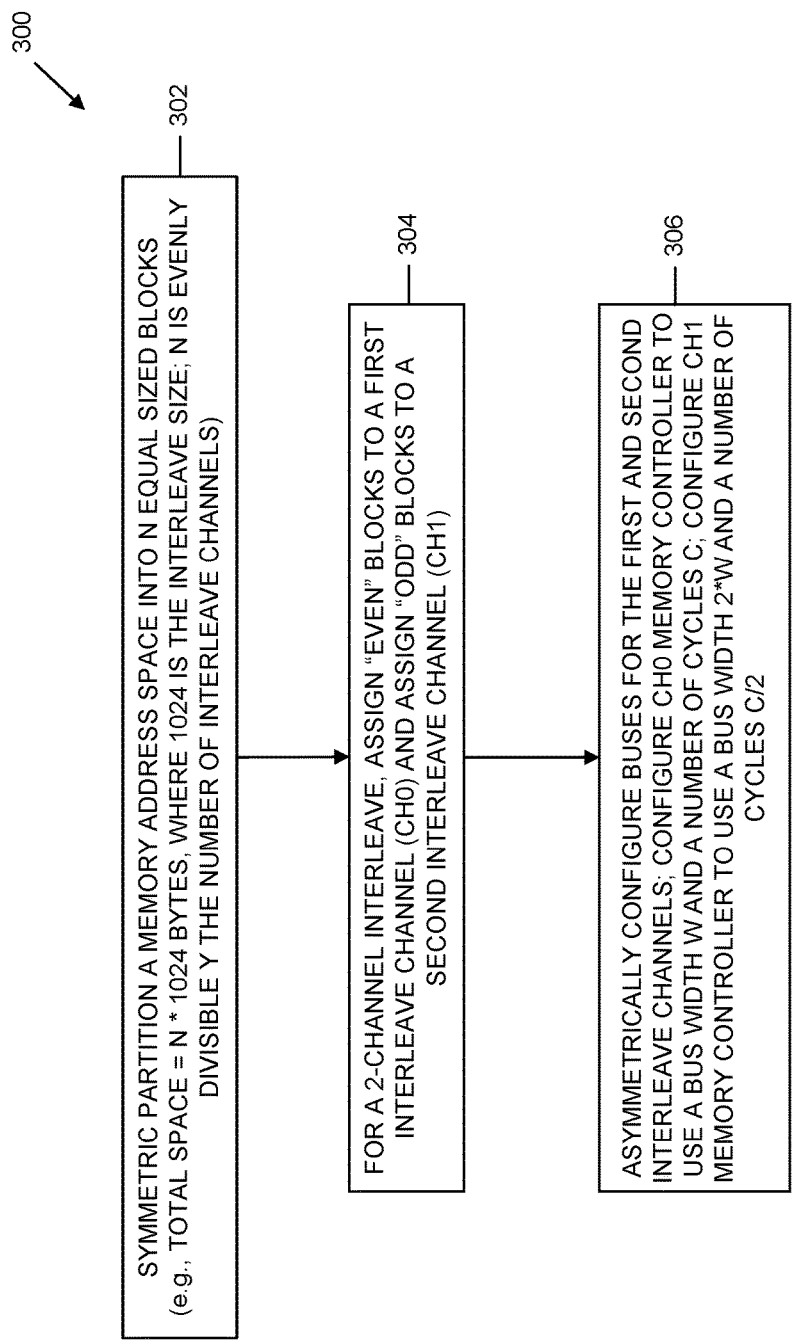
FIG. 3 is a flowchart illustrating an embodiment of a method implemented in the system of FIG. 1 for providing odd-modulus memory channel interleaving.

FIG. 3 illustrates an embodiment of a method 300 implemented in the system 100 for providing odd-modulus memory channel interleaving. At block 302, the entire physical memory space in the system 100 is partitioned into equal sized interleave blocks. For example, if the total physical memory is 4 gigabytes, and the interleave block size is 1024 bytes (1 kilobyte), then there will be N=4194304 blocks. In block 304, all blocks are evenly divided into the number of interleave ways. For example, in a 2-way interleave, blocks will be assigned in modulo-2 to channel 0 and channel 1. "Even" blocks (e.g., blocks 0, 2, 4, . . . [N−2]) are assigned to channel 0, and "odd" blocks (e.g., blocks 1, 3, 5, . . . [N−1]) are assigned to channel 1. By way of another example, in a 4-way interleave, blocks will be assigned in modulo-4 to channel 0, channel 1, channel 2, and channel 3. Blocks 0, 4, and 8 are assigned to channel 0, blocks 1, 5, and 9 are assigned to channel 1, blocks 2, 6, and 10 are assigned to channel 2, blocks 3, 7, and 11 are assigned to channel 3, and so forth. In this manner, the system 100 may implement power-of-2 interleaving, which is relatively simple and fast. As illustrated at block 306, the power-of-2 interleaving may be applied to an odd modulus DRAM bus. In block 306, the bus transactions (i.e., CH0 data packets 208 and CH1 data packets 212) may be configured asymmetrically. In an embodiment, packets for CH0 may have bus width W and a number of cycles C, and packets for CH1 may have twice the bus width (2*W) and half the number of cycles (C/2). Although each packet for CH0 and CH1 contain the same number of data bytes, the bandwidth of CH1 is twice the bandwidth of CH0. Therefore, the combined bandwidth of both CH0 and CH1 is three times the bandwidth of CH0.

Figure 5:
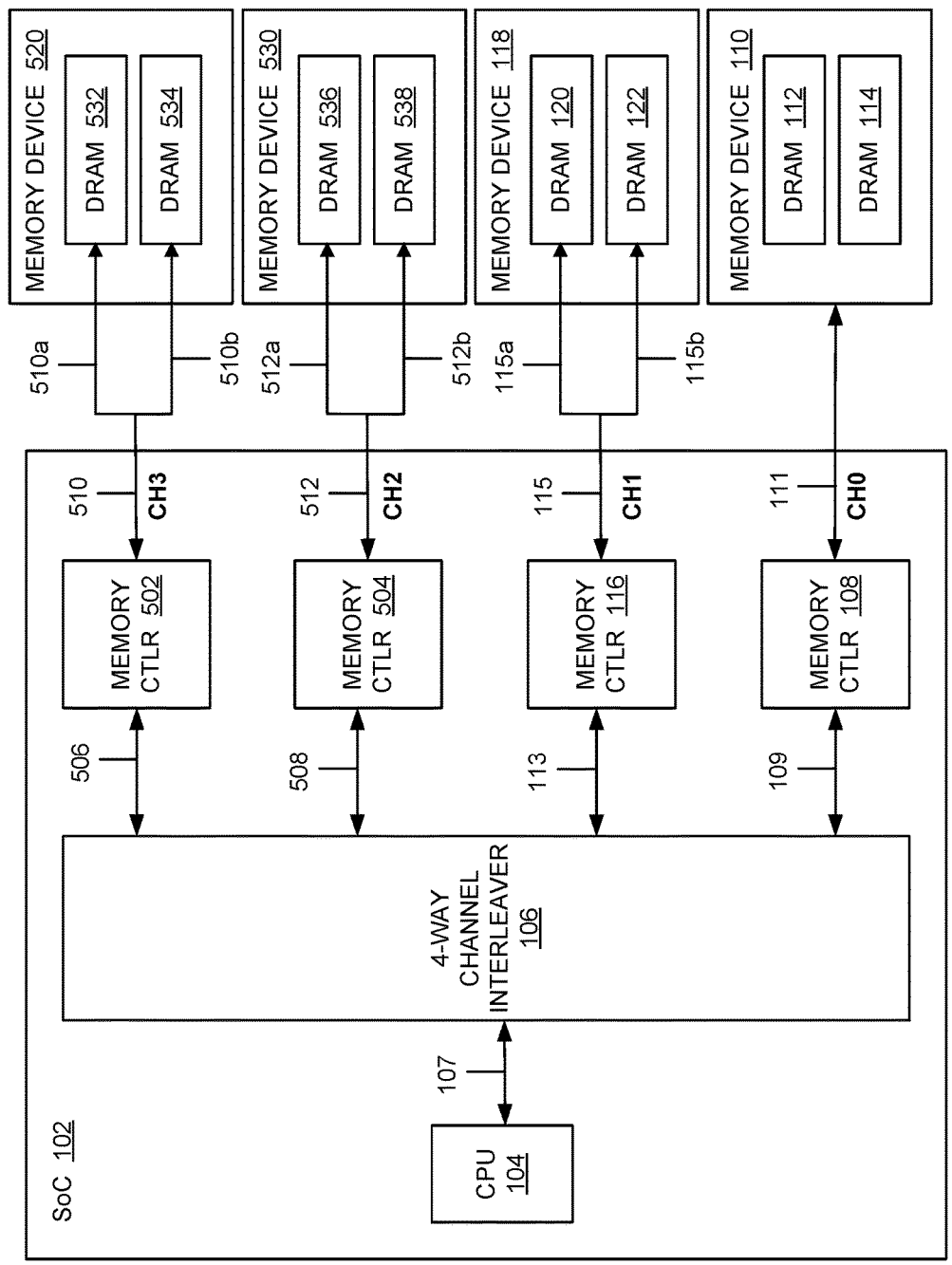
FIG. 5 is a block diagram of an embodiment of a system for providing seven-way memory channel interleaving.

As mentioned above, the system 100 may be adapted to support any odd number of memory channels (e.g., 5-way, 7-way, 9-way, etc.). FIG. 5 is an implementation of system 100 for providing seven-way memory channel interleaving. As illustrated in FIG. 5, the system 100 may physically interleave seven DRAM channels via the four memory channels CH0, CH1, CH2, and CH3 on bus 111, 115, 512, and 510, respectively. The first DRAM channel (which is used to access either DRAM module 112 or 114) is physically implemented via memory channel CH0 on all 16-bits of memory bus 111. The second DRAM channel (which is used to access DRAM module 120) may be provided via the upper 16 bits of CH1 memory bus 115 (represented by reference numeral 115a). The third DRAM channel (which is used to access DRAM module 122) may be provided via the lower 16 bits of CH1 memory bus 115 (represented by reference numeral 115b). The fourth DRAM channel (which is used to access DRAM module 536) may be provided via the upper 16 bits of CH2 memory bus 512 (represented by reference numeral 512a). The fifth DRAM channel (which is used to access DRAM module 538) may be provided via the lower 16 bits of CH2 memory bus 512 (represented by reference numeral 512b). The sixth DRAM channel (which is used to access DRAM module 532) may be provided via the upper 16 bits of CH3 memory bus 510 (represented by reference numeral 510a). The seventh DRAM channel (which is used to access DRAM module 534) may be provided via the lower 16 bits of CH3 memory bus 510 (represented by reference numeral 510b). Buses 115a and 115b operate concurrently as part of bus 115, buses 512a and 512b operate concurrently as part of bus 512, buses 510a and 510b operate concurrently as part of bus 510. In this manner, the width of the CH0 bus 111 is half of the width of the CH1, CH2, and CH3 memory buses 115, 512, and 510, respectively.

Figure 6:
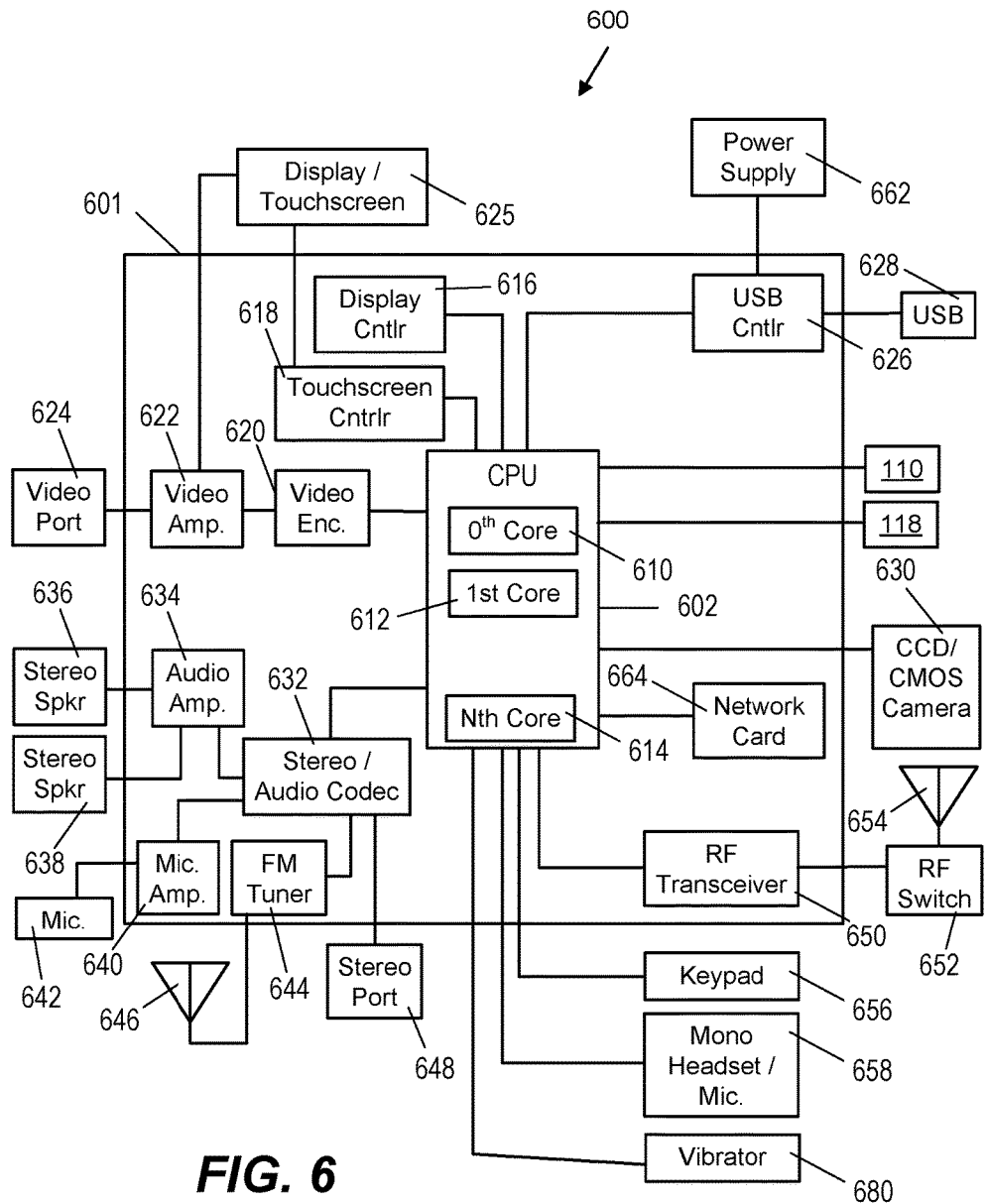
FIG. 6 is a block diagram of an embodiment of a portable computing device incorporating the system of FIG. 1 for providing odd-modulus memory channel interleaving.

As mentioned above, the system 100 may be incorporated into any desirable computing system. FIG. 6 illustrates the system 100 incorporated in an exemplary portable computing device (PCD) 600. The system 100 may be included on the SoC 601, which may include a multicore CPU 602. The multicore CPU 602 may include a zeroth core 610, a first core 612, and an Nth core 614. One of the cores may comprise, for example, a graphics processing unit (GPU) with one or more of the others comprising the CPU 104 (FIG. 1). According to alternate exemplary embodiments, the CPU 602 may also comprise those of single core types and not one which has multiple cores, in which case the CPU 602 and the GPU may be dedicated processors, as illustrated in system 100.

A display controller 628 and a touch screen controller 630 may be coupled to the CPU 602. In turn, the touch screen display 625 external to the on-chip system 601 may be coupled to the display controller 616 and the touch screen controller 618.

FIG. 6 further shows that a video encoder 620, e.g., a phase alternating line (PAL) encoder, a sequential color a memoire (SECAM) encoder, or a national television system(s) committee (NTSC) encoder, is coupled to the multicore CPU 602. Further, a video amplifier 622 is coupled to the video encoder 620 and the touch screen display 625. Also, a video port 624 is coupled to the video amplifier 622. As shown in FIG. 6, a universal serial bus (USB) controller 626 is coupled to the multicore CPU 602. Also, a USB port 628 is coupled to the USB controller 626. The external memory system and a subscriber identity module (SIM) card may also be coupled to the multicore 602. The external memory system may comprise DRAM modules 112, 114, 120, and 122 (FIG. 1), as described above. One or more aspects of the system 100 (FIG. 1) may be coupled to the 602 (e.g., symmetric memory channel interleaver 106).

Further, as shown in FIG. 6, a digital camera 630 may be coupled to the multicore CPU 602. In an exemplary aspect, the digital camera 630 is a charge-coupled device (CCD) camera or a complementary metal-oxide semiconductor (CMOS) camera.

As further illustrated in FIG. 6, a stereo audio coder-decoder (CODEC) 632 may be coupled to the multicore CPU 602. Moreover, an audio amplifier 634 may coupled to the stereo audio CODEC 632. In an exemplary aspect, a first stereo speaker 636 and a second stereo speaker 638 are coupled to the audio amplifier 634. FIG. 6 shows that a microphone amplifier 640 may be also coupled to the stereo audio CODEC 632. Additionally, a microphone 642 may be coupled to the microphone amplifier 640. In a particular aspect, a frequency modulation (FM) radio tuner 644 may be coupled to the stereo audio CODEC 632. Also, an FM antenna 646 is coupled to the FM radio tuner 644. Further, stereo headphones 648 may be coupled to the stereo audio CODEC 632.

FIG. 6 further illustrates that a radio frequency (RF) transceiver 650 may be coupled to the multicore CPU 602. An RF switch 652 may be coupled to the RF transceiver 650 and an RF antenna 654. As shown in FIG. 6, a keypad 656 may be coupled to the multicore CPU 602. Also, a mono headset with a microphone 658 may be coupled to the multicore CPU 602. Further, a vibrator device 680 may be coupled to the multicore CPU 602.

FIG. 6 also shows that a power supply 662 may be coupled to the on-chip system 601. In a particular aspect, the power supply 662 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 664 that may be used to access a data network, e.g., a local area network, a personal area network, or any other network. The network card 664 may be a Bluetooth network card, a WiFi network card, a personal area network (PAN) card, a personal area network ultralow-power technology (PeANUT) network card, a television/cable/satellite tuner, or any other network card well known in the art. Further, the network card 664 may be incorporated into a chip, i.e., the network card 664 may be a full solution in a chip, and may not be a separate network card 664.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A system for providing odd modulus memory channel interleaving, the system comprising:
    a dynamic random access memory (DRAM) system; and
    a system on chip (SoC) comprising:
        a first memory controller electrically coupled to a first DRAM module via a first memory bus, the first DRAM module comprising a first rank and a second rank;
        a second memory controller electrically coupled to a second DRAM module via a second memory bus, the second DRAM module comprising a third rank and a fourth rank; and
        a symmetric memory channel interleaver configured to uniformly distribute DRAM traffic to the first memory controller and the second memory controller, wherein the first memory controller and second memory controller are configured to provide an odd-way interleaving, and wherein:
        the first memory controller is configured to provide a first interleaved channel by accessing the first or second rank of the first DRAM module via the first memory bus, and
        the second memory controller is configured to provide a second interleaved channel to the second DRAM module by accessing the third rank via upper address bits on the second memory bus and a third interleaved channel to the second DRAM module by concurrently accessing the fourth rank via lower address bits on the second memory bus.

2. The system of claim 1, wherein the symmetric memory channel interleaver comprises a two-way interleaver.

3. The system of claim 1, wherein the symmetric memory channel interleaver uniformly distributes the DRAM traffic to the first and second memory controllers based on a memory address map.

4. The system of claim 3, wherein the memory address map comprises an interleaved address space for a first memory channel associated with the first memory bus, the first memory channel having a width of N bits where N is an integer, and a second memory channel associated with the second memory bus, the second memory channel having a width of 2N bits.

5. The system of claim 1 incorporated on a portable computing device.

6. The system of claim 1, wherein the portable computing device comprises one of smart phone, a tablet computer, and a wearable device.

7. A method for providing odd modulus memory channel interleaving, the method comprising:
    partitioning a memory address space for a dynamic random access memory (DRAM) system into a plurality of blocks;
    uniformly assigning the blocks to a first interleave channel in communication with a first DRAM rank and a second DRAM rank and a second interleave channel in communication with a third DRAM rank and a fourth DRAM rank; and asymmetrically configuring a first DRAM bus for the first interleave channel and a second DRAM bus for the second interleave channel to provide an odd-way interleave via the first and second interleave channels by:
the first interleave channel accessing the first DRAM rank or second DRAM rank using the first DRAM bus, and
the second interleave channel accessing the third DRAM rank using upper address bits on the second DRAM bus and concurrently accessing the fourth DRAM rank using lower address bits on the second DRAM bus.

8. The method of claim 7, wherein the first DRAM bus has a first bus width and the second DRAM bus has a second bus width, wherein the second bus width is twice as wide as the first bus width.

9. The method of claim 8, wherein the first DRAM bus has a first number of cycles and the second DRAM bus has a second number of cycles, wherein the second number of cycles is half of the first number of cycles.

10. The method of claim 7, wherein the asymmetrically configuring the first DRAM bus and the second DRAM bus comprises:
configuring a first memory controller and a second memory controller to provide the odd-way interleave via the first and second interleave channels.

11. The method of claim 10, wherein the first memory controller is electrically coupled to the DRAM system via the first DRAM bus, and the second memory controller is electrically coupled to the DRAM system via the second DRAM bus.

12. The method of claim 11, wherein the first DRAM bus has a first bus width and a first number of cycles, and the second DRAM bus has a second bus width and a second number of cycles, wherein the second bus width is twice as wide as the first bus width and the second number of cycles is half of the first number of cycles.

13. The method of claim 7, wherein the memory address space is partitioned into equal-sized interleave blocks.

14. The method of claim 7 executed by one or more processing devices on a portable computing device.

15. The method of claim 14, wherein the portable computing device comprises one of smart phone, a tablet computer, and a wearable device.

16. A system for providing odd modulus memory channel interleaving, the system comprising:
means for partitioning a memory address space for a dynamic random access memory (DRAM) system into a plurality of blocks;
means for uniformly assigning the blocks to a first interleave channel in communication with a first DRAM rank and a second DRAM rank and a second interleave channel in communication with a third DRAM rank and a fourth DRAM rank; and
means for asymmetrically configuring a first DRAM bus for the first interleave channel and a second DRAM bus for the second interleave channel to provide an odd-way interleave via the first and second interleave channels wherein:
the first interleave channel is configured to access the first DRAM rank or second DRAM rank using the first DRAM bus, and
the second interleave channel is configured to access the third DRAM rank using upper address bits on the second DRAM bus and concurrently access the fourth DRAM rank using lower address bits on the second DRAM bus.

17. The system of claim 16, wherein the first DRAM bus has a first bus width and the second DRAM bus has a second bus width, wherein the second bus width is twice as wide as the first bus width.

18. The system of claim 17, wherein the first DRAM bus has a first number of cycles and the second DRAM bus has a second number of cycles, wherein the second number of cycles is half of the first number of cycles.

19. The system of claim 16, wherein the means for asymmetrically configuring the first DRAM bus and the second DRAM bus comprises:
a first memory controller electrically coupled to the DRAM system via the first DRAM bus; and
a second memory controller electrically coupled to the DRAM system via the second DRAM bus.

20. The system of claim 16, wherein the first DRAM bus has a first bus width and a first number of cycles, and the second DRAM bus has a second bus width and a second number of cycles, wherein the second bus width is twice as wide as the first bus width and the second number of cycles is half of the first number of cycles.

21. The system of claim 16, wherein the memory address space is partitioned into equal-sized interleave blocks.

22. The system of claim 16 incorporated in a portable computing device.

23. The system of claim 22, wherein the portable computing device comprises one of smart phone, a tablet computer, and a wearable device.

24. A non-transitory computer readable medium having stored thereon instructions in computer-readable form that when executed by a processing device configure a dynamic random access memory (DRAM) system to provide odd modulus memory channel interleaving by configuring the DRAM system to:
partition a memory address space for the DRAM system into a plurality of blocks;
uniformly assign the blocks to a first interleave channel in communication with a first DRAM rank and a second DRAM rank and a second interleave channel in communication with a third DRAM rank and a fourth DRAM rank; and
asymmetrically configure a first DRAM bus for the first interleave channel and a second DRAM bus for the second interleave channel to provide an odd-way interleave via the first and second interleave channels by:
the first interleave channel accessing the first DRAM rank or second DRAM rank using the first DRAM bus, and
the second interleave channel accessing the third DRAM rank using upper address bits on the second DRAM bus and concurrently accessing the fourth DRAM rank using lower address bits on the second DRAM bus.

25. The non-transitory computer readable medium of claim 24, wherein the first DRAM bus has a first bus width and the second DRAM bus has a second bus width, wherein the second bus width is twice as wide as the first bus width.

26. The non-transitory computer readable medium of claim 25, wherein the first DRAM bus has a first number of cycles and the second DRAM bus has a second number of cycles, wherein the second number of cycles is half of the first number of cycles.

27. The non-transitory computer readable medium of claim 24, wherein a first memory controller is electrically coupled to the DRAM system via the first DRAM bus, and a second memory controller is electrically coupled to the DRAM system via the second DRAM bus.

28. The non-transitory computer readable medium of claim 27, wherein the first DRAM bus has a first bus width and a first number of cycles, and the second DRAM bus has a second bus width and a second number of cycles, wherein the second bus width is twice as wide as the first bus width and the second number of cycles is half of the first number of cycles.

29. The non-transitory computer readable medium of claim 24 incorporated on a portable computing device.

30. The non-transitory computer readable medium of claim 29, wherein the portable computing device comprises one of smart phone, a tablet computer, and a wearable device.

\* \* \* \* \*